US012506809B2

(12) United States Patent
Curry

(10) Patent No.: US 12,506,809 B2
(45) Date of Patent: Dec. 23, 2025

(54) PHONE INTERFACE SYSTEM WITH PENDANT

(71) Applicant: Damon Curry, Beavercreek, OH (US)

(72) Inventor: Damon Curry, Beavercreek, OH (US)

( * ) Notice: Subject to any disclaimer, the term of this patent is extended or adjusted under 35 U.S.C. 154(b) by 0 days.

(21) Appl. No.: 18/927,820

(22) Filed: Oct. 25, 2024

(65) Prior Publication Data
US 2025/0055915 A1    Feb. 13, 2025

Related U.S. Application Data

(63) Continuation-in-part of application No. 17/458,528, filed on Aug. 26, 2021, now Pat. No. 12,132,869.

(60) Provisional application No. 63/070,660, filed on Aug. 26, 2020.

(51) Int. Cl.
*H04W 4/00*     (2018.01)
*G06F 3/04817*  (2022.01)
*G06F 3/0488*   (2022.01)
*G08B 25/00*    (2006.01)
*H04L 67/125*   (2022.01)
*H04M 3/42*     (2006.01)

(52) U.S. Cl.
CPC ........ *H04L 67/125* (2013.01); *G06F 3/04817* (2013.01); *G06F 3/0488* (2013.01); *G08B 25/00* (2013.01); *H04M 3/42* (2013.01)

(58) Field of Classification Search
CPC . H04L 67/125; G06F 3/04817; G06F 3/0488; H04M 3/42; H04W 4/90
See application file for complete search history.

(56) References Cited

U.S. PATENT DOCUMENTS

2004/0161085 A1 *  8/2004  Horne ................ H04M 3/436
                                                          379/142.01
2018/0365958 A1 * 12/2018  Beszteri ............... H04W 4/38

* cited by examiner

*Primary Examiner* — Omoniyi Obayanju
(74) *Attorney, Agent, or Firm* — Maxwell L. Minch; Maxwell L Minch Esq. PA

(57) ABSTRACT

The present invention provides for phone interface systems providing for the elderly. The present invention provides for a telephone management system blending landline technology with landline or cell phone networks, and bridging the technology and functionality gap for seniors. Aspects of the invention provide for network interface systems which include interfaces for allowing use of landline systems with cellular technology, providing video displays to allow for touch access to numbers, and to synch actuators and sensors with the interface system.

20 Claims, 5 Drawing Sheets

PHONE INTERFACE SYSTEM WITH PENDANT

CROSS-REFERENCE TO RELATED APPLICATIONS

This application is a Continuation in Part of U.S. Non-Provisional application Ser. No. 17/458,528, having a filing date of Aug. 26, 2021, now patented, and U.S. Provisional Application No. 63/070,660, having a filing date of Aug. 26, 2020, the disclosure of which is hereby incorporated by reference in its entirety and all commonly owned.

FIELD OF THE INVENTION

The present invention relates in general to phone interface systems, and in particular phone interface systems for interfacing with cellular or non-cellular telephone systems to a microprocessor-driven automated electronic device for communication monitoring and assistance.

BACKGROUND OF THE INVENTION

Individuals living in the "sandwich generation" frequently encounter complications when it comes to incorporating technology into the lives of their elder parents. Being split between their own families and assisting with their aging parents, these individuals often seek assistance to best manage their time and energy. Mobile devices and other technologies can provide a suitable bridge to assist individuals, however problems arise because much of this technology requires interfacing by the elderly who have trouble adapting to the rapid advancements in technology, and inability to manipulate the touch screen and/or controls.

Complications further arise if the elder or other users are suffering from injuries or disease which affect their fine motor skills, such as Parkinson's disease. In addition, complications arise generally as a result of poor eyesight because of the typically small user interfaces. Elderly persons often are unfamiliar with and therefore reluctant to use devices as complex as a modern smart phone. Thus there remains an unmet need to bridge elderly persons with technology to allow for improved communication and better care.

Some attempts have been made to improve the relationship with elderly individuals and technology. This includes, limiting the number of icons present on a screen, adjusting icon and lettering sizes, and providing magnification features for the displays. However, these solutions present new problems, especially when application notifications, often very technical, are received through the devices, where the applications themselves have not been adapted. Accordingly push notifications to upgrade software, or worse, to sign up for unintended services, remain a challenge for the elderly even with current attempts to make use of newer technology easier.

Other attempts by cellular providers have been made which offer special phones for seniors or handicapped persons who aren't comfortable with other modern cell phones. These special phones simply implement the features discussed above (e.g. larger buttons, limitation of icons, larger icons and keypad). Worse, many of these cell phones cannot be incorporated on a family mobile device plan except the plan offered by the phone provider, thus costing seniors 2 to 3 times more, which can be significant on the fixed incomes of most seniors. Thus there remains an unmet need for a mobile solution which allows for the cost savings of being able to use any carrier, and taking advantage of family plans and networks, with a user interface that's comfortable to an elderly or handicapped user.

When polled, most seniors still prefer the use of landline telephones. Getting service for landline telephones is relatively common and easy, however problems still arise, requiring a solution, when it comes to the elderly remembering the important numbers to be dialed, assistance in taking phone messages, and contacting emergency providers. Attempts have been made to include landline phone systems which have preprogrammed numbers, or lists beside the phone, but problems still arise with reading the information next to the preprogrammed numbers or reading the list. In addition, because in some instances seniors are slower to get to the phone, many missed important calls occur. Thus there remains an unmet need for a telephone management system blending landline technology with landline or cell phone networks, and bridging the technology and functionality gap for seniors.

SUMMARY OF INVENTION

The present invention provides for phone interface systems providing for the elderly. The present invention provides for a telephone management system blending landline technology with landline or cell phone networks, and bridging the technology and functionality gap for seniors. Aspects of the invention provide for network interface systems which include interfaces for allowing use of landline systems with cellular technology, providing video displays to allow for touch access to numbers, and to synch actuators and sensors with the interface system.

Aspects of the proposed device will be able to act as an automated telephone operator to block calls from spammers. Certain embodiments answer an incoming call without notifying the called person, then require the caller to enter a numeric code that, if correctly entered, would cause the telephone device to ring so the caller and the calling party could be connected.

Other aspects is that the present invention acts as a "bridge" between landline and cell phone devices and networks.

BRIEF DESCRIPTION OF THE DRAWINGS

Examples illustrative of embodiments of the disclosure are described below with reference to figures attached hereto. In the figures, identical structures, elements or parts that appear in more than one figure are generally labeled with the same numeral in all the figures in which they appear. Dimensions of components and features shown in the figures are generally chosen for convenience and clarity of presentation and are not necessarily shown to scale. Many of the figures presented are in the form of schematic illustrations and, as such, certain elements may be drawn greatly simplified or not-to-scale, for illustrative clarity. The figures are not intended to be production drawings. The figures (FIGS.) are listed below.

Figure 1:
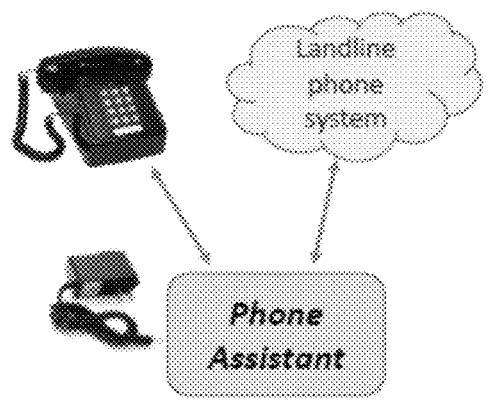
FIG. 1 provides a block diagram of one embodiment of the phone interface system where a landline telephone is implemented for use with the invention, where the invention serves as an intermediary assistant to the user.
Figure 2:
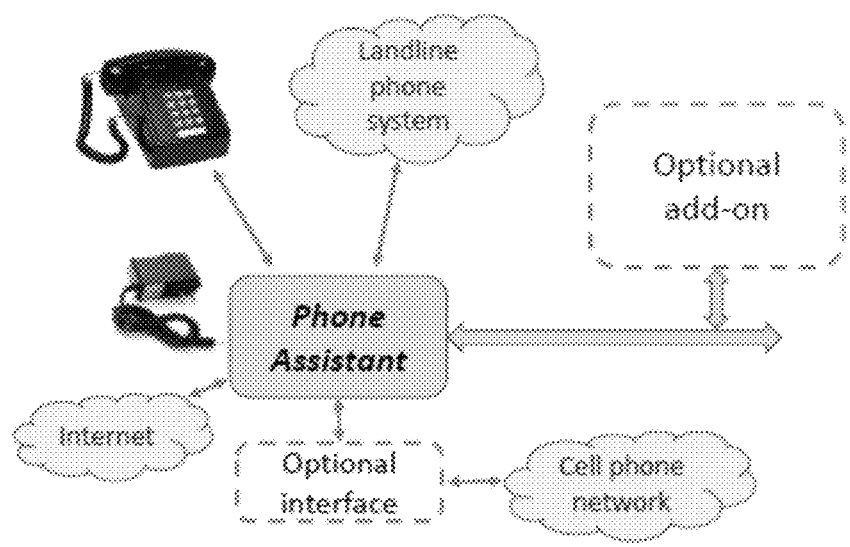
FIG. 2 illustrates the invention in an expanded configuration compared to FIG. 1, bridging the traditional landline telephone device with a cell phone network and also connecting to the Internet.
Figure 3:
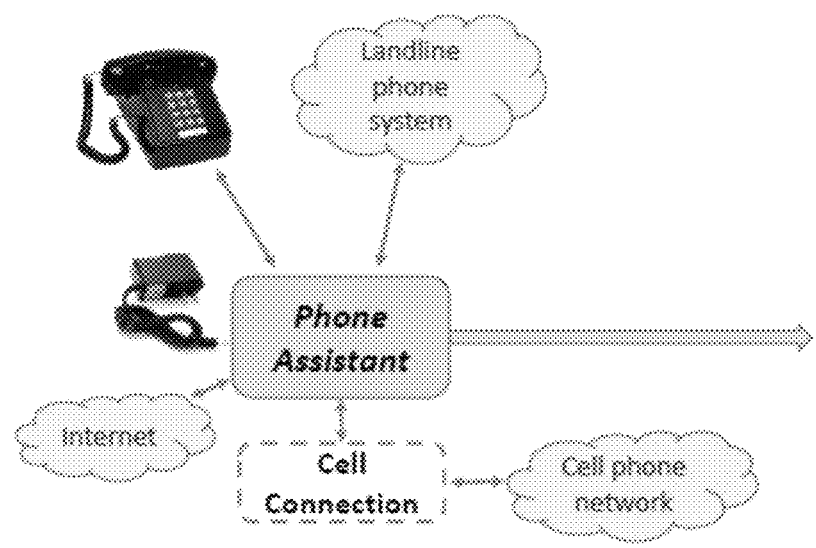
FIG. 3 illustrates the invention in a further expanded configuration compared to FIG. 2, bridging the traditional landline telephone device with a cell phone network and also connecting to the Internet, and showing addition of other optional components.
Figure 4:
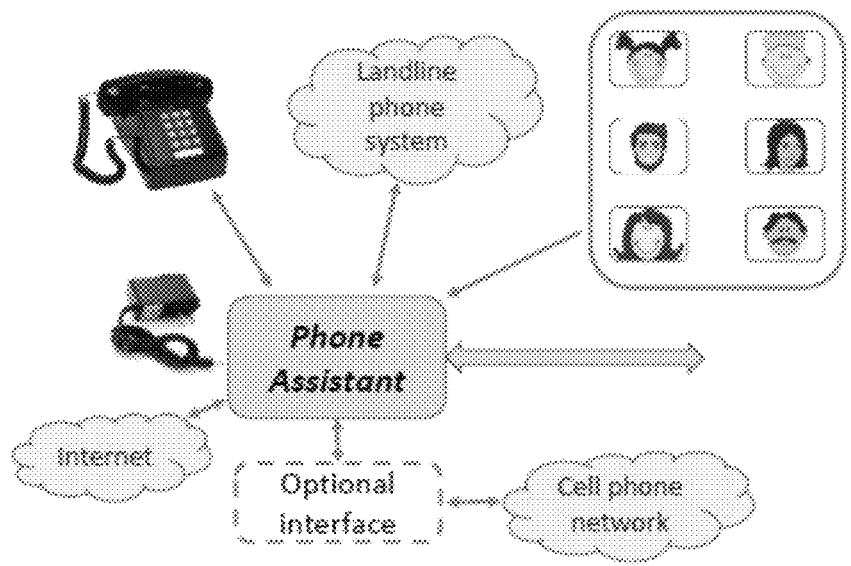
FIG. 4 expands on FIG. 3 with addition of a video display that makes the user interface easier and better for many users, with features such as display of emergency numbers to be dialed.
Figure 5:
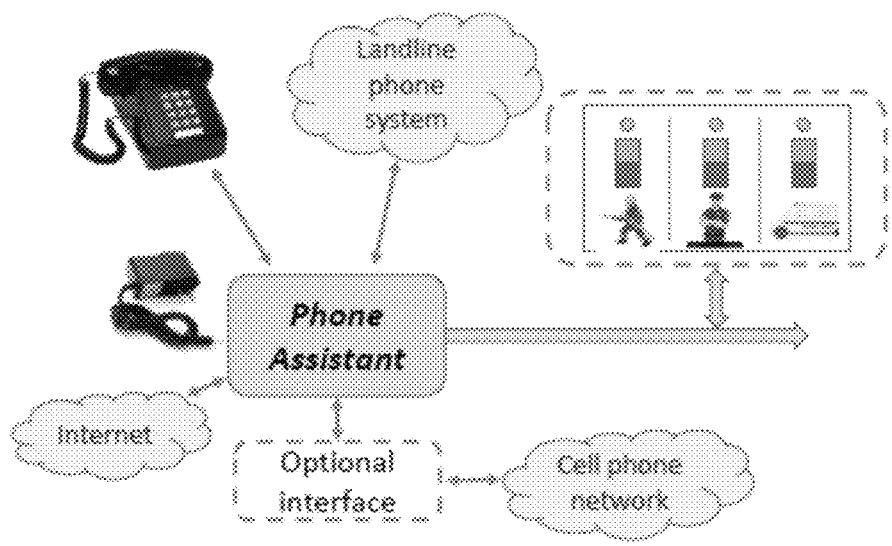
FIG. 5 expands on FIG. 3 with addition of a video display that makes the user interface easier and better for many users, with features such as display of photos of persons either calling or to be dialed.
Figure 6:
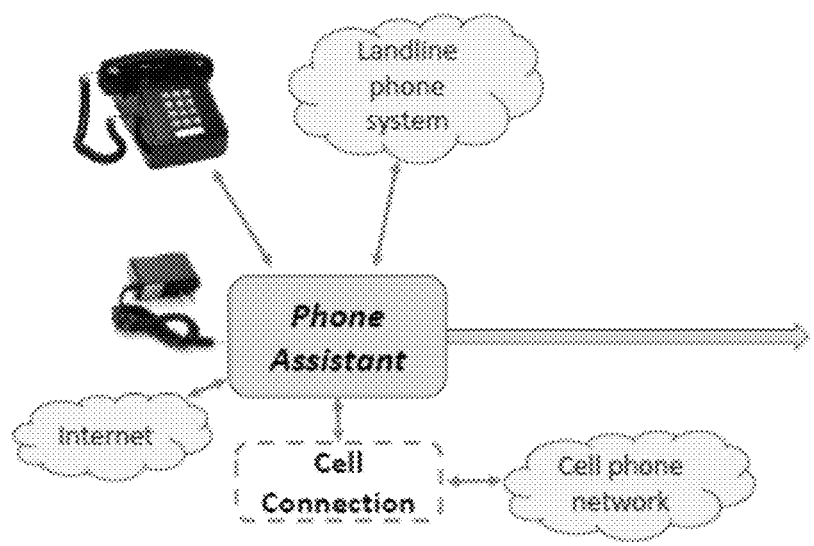
FIG. 6 expands on FIG. 2 with addition of a cellular connection and cell phone network allowing the phone assistant to bridge landline technology with a cellular network.
Figure 7:
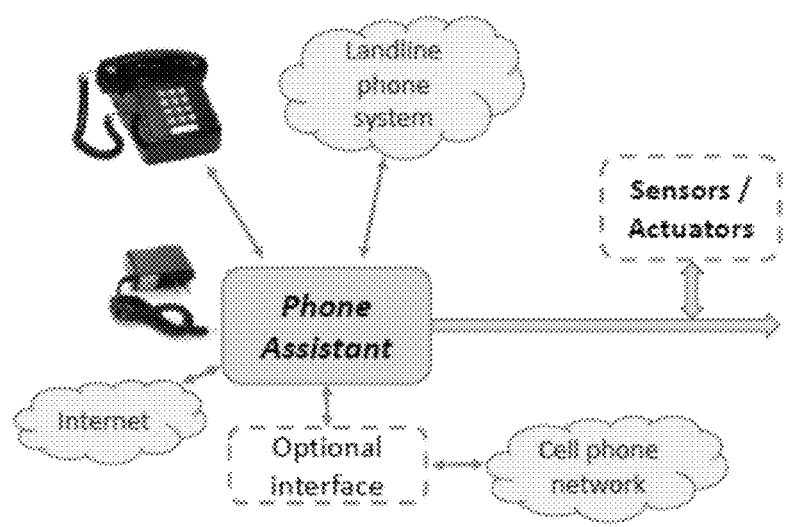
FIG. 7 expands on FIG. 3 with addition of sensors and actuators.
Figure 8:
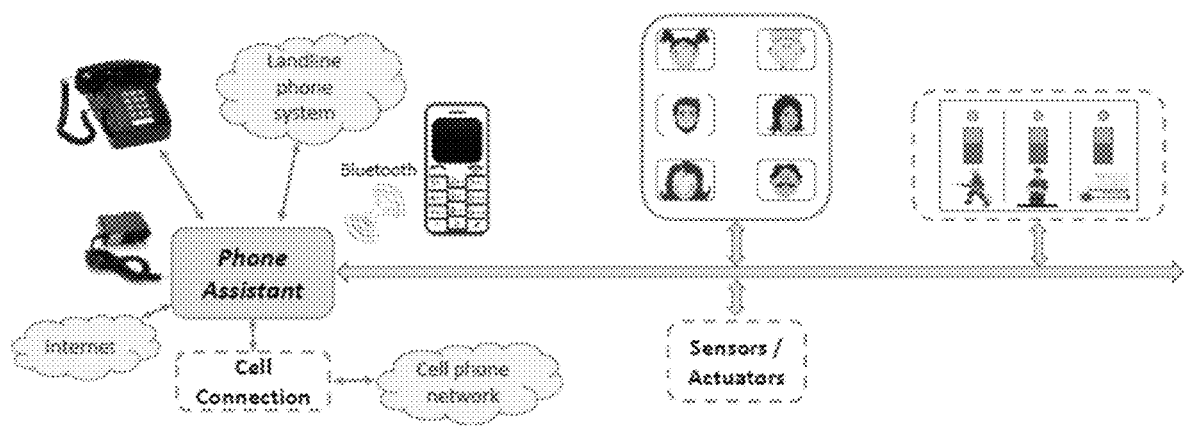
FIG. 8 illustrates a system overview diagram showing how the inventive phone interface system is being implemented.
Figure 9:
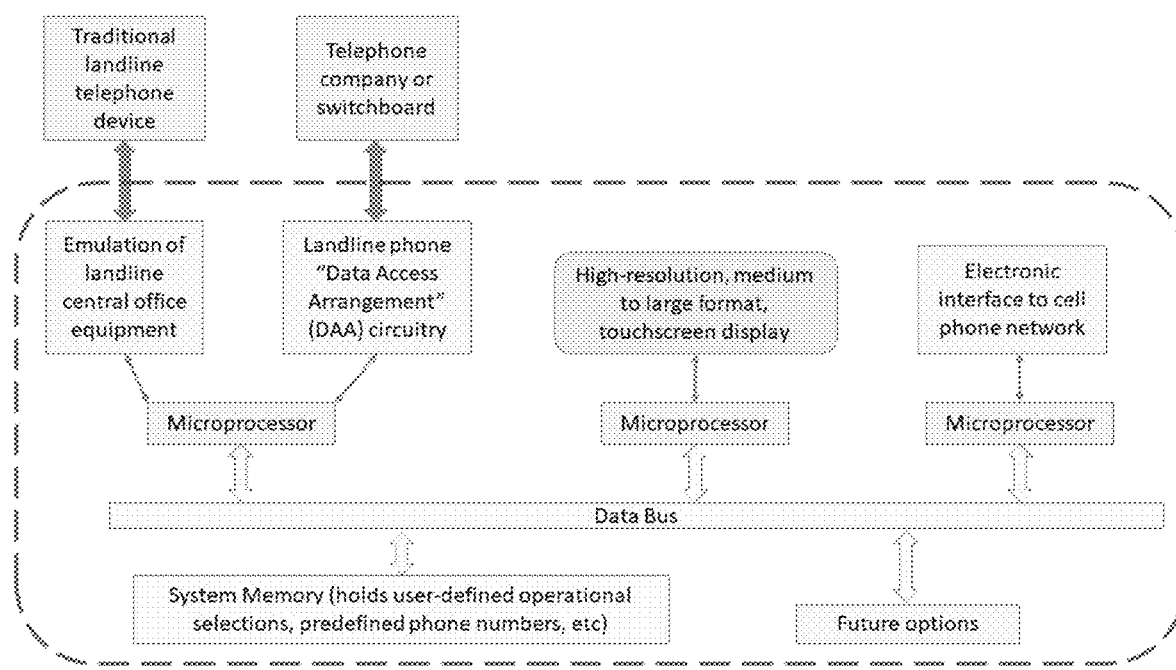

It should be clear that the description of the embodiments and attached Figures set forth in this specification serves only for a better understanding of the invention, without limiting its scope. It should also be clear that a person skilled in the art, after reading the present specification could make adjustments or amendments to the attached Figures and above described embodiments that would still be covered by the present invention.

DETAILED DESCRIPTION OF THE INVENTION

The following detailed description is merely exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention, but are presented for illustrative and descriptive purposes only.

The present invention contains the features of a telephone interface systems as herein described.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

General

The present invention provides embodiments of one or more telephone interface systems for use in call management. Inventive embodiments of the telephone interface systems include at least one communication device, at least one microprocessor-driven automated electronic device, at least one communication network, and at least one interface device. Embodiments of the present invention are intended for various functional uses, including but not limited to, call screening, automated phone assistance, and emergency notification. Some embodiments of the inventive system are custom tailored to the needs of individuals with mental and physical handicaps. By way of example, and not limited to the particular suggestions, the system may allow for communication with wired or wireless devices, Internet connection capabilities, Wi-Fi, Bluetooth connectivity, touch displays, customized dial pads, and user instruction adaptability.

Embodiments of the inventive system may be made from any material known in the art, and nothing herein is intended to limit the materials with which the inventive system is to be made.

Communication Capabilities and Settings

Embodiments of the present invention provide for systems with communication devices that may be wireless, wired, or a combination of both. The communication devices allow for communication between wireless and wired devices in real-time via mobile communication networks. Any one or combination of these separate devices, combined into a single or plurality of systems, produce a means for real-time communication among the devices and other devices connected to the same network.

Further embodiments of the present invention provide for systems which provide one or more interface devices, which would be useful to virtually any individual or group of individuals, and is not limited to a single industry, profession, or age group. Embodiments of the interface devices are capable of monitoring incoming and outgoing calls against a preferred list of numbers, and are able to connect one or more communication devices to one or multiple communication networks if the number dials is present on the preferred list. If a number is not on the preferred list, embodiments of the present invention are capable of blocking such numbers.

In at least one embodiment of the present invention, the interface device requires a caller to respond to at least one affirmative response as a prerequisite of the interface device moving forward with connecting the call with the system user. Such affirmative responses include, but are not limited to, responding to voice prompts, silent prompts, or numeric entries.

Further, in at least one embodiment, the system user may set instructions for the interface device to limit ingoing and outgoing calls during particular times of the day.

Touch Screen Display

In at least one embodiment of the present invention, the system is compatible with at least one touch screen display. In some embodiments, the touch screen display may feature one or more icons that represent specific preferred phone numbers from a list of preferred numbers. Some embodiments may also feature customized dial pads that can be generally adjusted to individual preferences, but can also accommodate one or more users' mental or physical handicaps.

Emergency Response Communication

In at least one embodiment of the present invention's touch screen, there is at least one option for communication with emergency support. Emergency support communication includes, but is not limited to law enforcement, fire departments, emergency (911), and medical assistance. At least one embodiment is capable of accommodating one or more users' mental or physical handicaps.

Some embodiments of the inventive system include options for communicating with emergency support. These include, but at not limited to, graphical switches that require particular manipulation to prevent inadvertent selections.

Alerts and Third-Party Use

In at least one embodiment of the system, the interface device provides for mobile alerts or messages to at least one third-party user. Some embodiments of the interface device further allow system users to designate a caregiver as an authorized third-party user through user instructions.

Embodiments of the present invention also provide for alerts and messages to the system user. These alerts include, but at not limited to system status, numbers dialed by the system user, updates regarding numbers that called the system user, missed calls, missed messages, and alerts for when an emergency support button is selected or a connected sensor is activated.

User Interaction with, and Instructions for, System

In at least one embodiment of the present invention, the system user is able to provide instructions for the interface device. Such instructions include, but are not limited to, programming the interface device to connect to at least one telephone device, setting alert notification settings, authorizing third-parties to review alerts, and setting automated interface device answering settings.

Some embodiments may contain even more advanced instruction settings for user and device interaction. By way of example, and not limited to the particular suggestions, the user may define the success or failure of a predetermined status check through an automated phone call, pressing one or more dial-pad keys, or speaking in response to an automated message.

Further embodiments of the present inventive system also allow the user to provide the interface device with instructions to decline calls not on an approved number list or received outside of predetermined hours. Some embodiments may also allow the user to instruct the system to decline duplicate calls from numbers previously missed by the system user.

System Compatibility and Remote Connectivity

In at least one embodiment of the present invention, the interface device is equipped with sensors or actuators allowing for the interface device to connect, interface, or listen for third-party inputs. By way of example, and not limited to the particular suggestions, such connectivity may include security devices and home monitoring systems. Some embodiments may also be compatible with other devices, including, but not limited to, motion detectors, fire/smoke alarms, burglar alarms, motion detectors, warning lights and sirens, or wearable devices.

Further, at least one embodiment of the present invention is capable of being remotely monitored and reconfigured when connected to the Internet. Remote monitoring and reconfiguration may be performed by one or more authorized persons from various devices capable of accessing the Internet. Such devices include, but are not limited to, computers and mobile phones.

Caller Directed Connection (CDC)

In at least one embodiment of the present invention, the interface device introduces a Caller Directed Connection (CDC) feature, allowing specific authorized callers to connect with the end-user without requiring any manual interaction on the end-user's part. In such embodiments, authorized callers, such as caregivers or emergency personnel, enter a unique code during a call, prompting the system to immediately connect them. It should be appreciated that embodiments incorporating such features provide significant benefits in situations where the end-user may be incapacitated or otherwise unable to answer manually, streamlining assistance and enhancing response times. Furthermore, unlike conventional systems, which require end-user action to connect, the CDC feature in such embodiments bypasses this, thus supporting uninterrupted and accessible communication.

Emergency Pendant Device

In at least one embodiment of the present invention, the system includes a wearable emergency pendant that enables end-users to request assistance remotely. In such embodiments, the pendant is designed to be lightweight and easy to activate, featuring a single pushbutton that transmits a unique, encrypted signal to the interface device base unit. Upon receiving this signal, the system can initiate a range of customizable responses. In at least one non-limiting example, the system and interface device can be programmed to contact emergency services, call a designated caregiver, send a pre-recorded message with location information, or combinations thereof. In such embodiments, the emergency pendant's range extends suitably to areas that a user is intended to be located. In at least one embodiment, the emergency pendant's range extends up to half a mile, providing freedom of movement for the user while ensuring reliable connectivity to the system.

Configurable Emergency Response Sequences

In at least one embodiment of the present invention, the functionality of the emergency pendant and the interface system supports user-configurable response sequences. In such embodiments, these sequences can be adjusted to meet the specific needs of different end-users, including options to prioritize calling 911, contacting caregivers, or triggering a series of notifications. In at least one embodiment of the present invention, the system allows for easy customization of these sequences through a dedicated interface, which can be accessed by the user or authorized personnel by the user. It should be appreciated that this flexibility ensures that the device remains responsive to the unique circumstances and health conditions of each user.

Bidirectional Audio Capabilities

In at least one embodiment of the present invention, the inventive interface device, or inventive system, includes bidirectional audio capabilities, allowing real-time voice communication between the end-user and authorized callers or responders. It is believed that this feature ensures that callers can assess the user's condition audibly and communicate necessary instructions or reassurance. In such embodiments, the system leverages noise-canceling technology to maintain clear audio quality, even in challenging environments. In at least one embodiment of the present invention, in an emergency, this feature can be vital for effective communication, allowing caregivers or emergency responders to gather immediate information directly from the user.

Remote Control of Connected Devices

In at least one embodiment of the present invention, the system supports the control of external digital and analog devices through a proprietary interface. It should be appreciated that this capability allows authorized users to manage connected devices remotely, such as turning on lights, adjusting thermostats, or activating relays. In such embodiments, the interface includes secure, encrypted protocols to prevent unauthorized access, ensuring that only approved users can control these devices. It should be appreciated that remote control functionality enhances the end-user's quality of life, offering comfort and security through the ability to manage home environments directly or indirectly.

Remote Status Monitoring

In at least one embodiment of the present invention, in addition to device control, the system includes functionality for monitoring the status of connected devices. In such embodiments, authorized users can access real-time data on various environmental parameters, such as room temperature, humidity, or the operational status of medical equipment. In at least one embodiment, the status monitoring feature provides valuable insights, enabling caregivers to proactively address potential issues, like adjusting heating or cooling systems for optimal comfort or ensuring that essential devices remain operational.

Enhanced Range and Signal Stability

In at least one embodiment of the present invention, the inventive interface device, or system thereof, is designed to provide enhanced signal stability and an extended range of operation, particularly beneficial in remote or rural areas. In such embodiments, the inventive interface device supports both cellular and landline connections, allowing it to function effectively even in areas with limited internet connectivity. This robust connectivity framework ensures that the system remains operational across a wide geographic range, providing continuous support to users regardless of their location.

Integration of Voice Over IP (VoIP) Capabilities

In at least one embodiment of the present invention, the inventive interface device, or system thereof, includes the integration of Voice Over IP (VoTP) capabilities, allowing for internet-based voice calls. Such embodiments enable the device to connect to wireless networks, further expanding its reach and functionality. It should be appreciated that with VoIP, the system can support additional features such as remote reprogramming, data logging, and extended monitoring options. This future capability makes the system adaptable to advancing technologies and ensures long-term relevance in both urban and rural settings.

Data Security and Encrypted Communication

In at least one embodiment of the present invention, all communications of the inventive interface device, or system thereof, includes audio, device control commands, and status monitoring data, all of which are encrypted to protect the privacy and integrity of user information. In at least one embodiment, the system, or interface device, employs advanced encryption protocols to prevent unauthorized access, ensuring that sensitive data, especially related to health and safety, remains secure. It should be appreciated that this focus on data security is crucial for maintaining user trust and compliance with relevant privacy regulations.

User-Centric Design and Accessibility Features

In at least one embodiment of the present invention, the inventive interface device, or system thereof, is designed with user accessibility in mind. In such embodiments, the phone interface, and/or system, is simple and intuitive, with large, clearly labeled buttons and voice-assisted prompts. In such embodiments, the pendant and base unit are both constructed from lightweight, durable materials, making them easy to handle and suitable for daily use. In addition, in such embodiments, the interface device, or system, supports audio feedback and visual indicators to confirm successful operations, providing users with peace of mind and enhancing their confidence in the system.

OTHER EMBODIMENTS

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The foregoing description is illustrative of particular embodiments of the invention, but is not meant to be a limitation upon the practice thereof. The following claims, including all equivalents thereof, are intended to define the scope of the invention.

The invention claimed is:

1. A telephone interface system, the system comprising: one or more communication devices; one or more microprocessor-driven automated electronic devices; one or more communications networks; and
one or more interface devices for connecting to said one or more communication devices and said one or more communications networks, said interface device comprising: a power supply; an interface for said one or more communication devices; a communication means for communicating with said one or more communications networks; caller directed connection (CDC) module configured to allow authorized callers to connect with the system without requiring manual input from an end-user; a remote emergency pendant device configured to transmit an emergency signal to the interface device, initiating a preconfigured response sequence upon activation; a bidirectional audio component for real-time communication between the end-user and authorized callers; and a secure control mechanism allowing authorized users to remotely operate external connected devices.

2. The system of claim 1 wherein said one or more communication devices is a wireless mobile device, a wired telephone device, or combinations thereof.

3. The system of claim 1 wherein said one or more communications networks is a mobile communication network, an internet communication system, a wired telephone communication system (Public Switched Telephone Network), Wi-Fi, Bluetooth, or combinations thereof.

4. The system of claim 1 wherein said interface device interfaces with a wired telephone device and a mobile communication network, wherein said interface device allows for telephonic communication via a mobile communication network using a wired telephone device.

5. The system of claim 1 wherein said interface device further comprises a processor for processing incoming and outgoing calls.

6. The system of claim 5 wherein said processing performed by said interface device is capable of monitoring incoming and outgoing calls against a preferred list of numbers and connecting one or more communication devices to the one or more communications networks if the number dialed is present on said preferred list, and blocking said call if said number is not on said preferred list.

7. The system of claim 5 wherein said interface device requires a correct caller response for at least one voice prompt, at least one silent prompt, at least one demand for numeric entry, the like of other forced caller interactions, or combinations thereof as a prerequisite of said interface device connecting the call with at least one user.

8. The system of claim 5 wherein said processing performed by said interface device is limiting incoming and outgoing calls during particular times of day.

9. The system of claim 1 further comprising one or more touch screen display.

10. The system of claim 9 wherein said touch screen display includes one or more icons representing one or more preferred numbers from said preferred list of numbers.

11. The system of claim 9 wherein said touch screen display includes at least one customized dial pad for use by at least one user, and at least one embodiment is capable of accommodating one or more users' mental or physical handicaps.

12. The system of claim 9 wherein said touch screen display includes a one or more options for communicating with emergency support such as a police department, fire department, emergency (911), or medical assistance, and at least one embodiment is capable of accommodating one or more users' mental or physical handicaps.

13. The system of claim 12 wherein said options for communicating with emergency support include graphical switches which require particular manipulation to prevent from inadvertent selection.

14. The system of claim 1, wherein said interface device further comprises providing mobile alerts or messages to one or more third party users, wherein at least one embodiment of said interface device allows one or more users, or said users designated caregiver, to store user provided instructions.

15. The system of claim 14 wherein said mobile alerts or messages includes status alerts of said user and user's system, information related to numbers dialed by user, information related to numbers who called user, missed calls and/or messages related thereto, status alerts if one or more emergency support buttons are selected, or combinations thereof.

16. The system of claim 14 wherein said instructions for said interface device are capable of being programmed to connect to at least one telephone device to alert at least one user to review the status of one or more alerts from said interface device by means of an automated and collaborative interaction between said system and said one or more users.

17. The system of claim 14 wherein at least one embodiment of said instructions allow for one or more users to define the success or failure of said status checks through an automated phone call, pressing one or more dial-pad keys, speaking in response to an automated message, other affirmative response actions, or combinations thereof.

18. The system of claim 1 wherein said interface device further comprises a phone answering system which answers calls not on the approved number list, calls received outside of selected hours, or calls missed by user.

19. The system of claim 1 wherein said interface device further comprises of one or more sensors or actuators which connect, interface, or listen for third party input, including, but not limited to, security devices, home monitoring systems, and the like.

20. The system of claim 19 wherein said third party input includes fire/smoke alarms, burglar alarms, motion detectors, warning lights and sirens, wearable devices, or a combination thereof.

* * * * *